United States Patent Office 3,332,556
Patented July 25, 1967

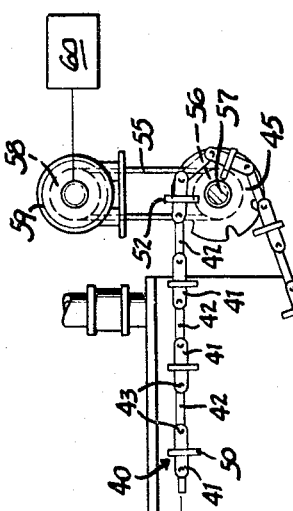

3,332,556
FILTER APPARATUS
Gene Hirs, 6865 Meadowlake, Birmingham, Mich. 48010
Filed Apr. 21, 1964, Ser. No. 361,413
4 Claims. (Cl. 210—406)

ABSTRACT OF THE DISCLOSURE

An endless conveyor having transverse flights of two different heights is disposed above a filter medium. Means continuously move the conveyor during filtration past the filter cake on the medium whereby certain of the flights remove a top layer of the cake and the remaining flights remove the entire cake.

---

The present invention relates to an apparatus for filtering. More particularly, this invention relates to the filtration of solid contaminants from liquid suspension by maintaining on a fixed primary filter medium a layer of such contaminants to serve as a secondary filter medium and periodically removing a portion of the contaminants from the primary filter medium to maintain a desired filtering efficiency.

In my earlier issued United States Letters Patent Nos. 3,087,620 and 3,091,336, I have disclosed filter apparatus utilizing a fibrous web as the filter medium, the web being interposed between a body of contaminated liquid and a lower vacuum chamber from which filtrate liquid is withdrawn. Overlying the fibrous medium and holding it in its interposed position is an intermittently actuated conveyor having flights contacting the web to advance the web for renewing the same when a deleterious amount of contaminant has accreted on the web.

In such a system, in order to renew the filter medium it is necessary (1) to sense the pressure drop across the fibrous web, (2) to break the vacuum in the vacuum chamber when this pressure drop exceeds a predetermined minimum, and (3) to actuate the conveyor to interpose a fresh portion of the fibrous web in effective filtration position. Thus, a fairly complicated and expensive control system is necessary, various control functions have to be carried out throughout the operation of the apparatus, and some degree of filter down-time is necessary during renewal of the medium.

The present invention now proposes an extremely simple, efficient and inexpensive filter apparatus wherein these various control functions are eliminated, continuous filtration is obtained, and the necessity for utilizing a fibrous web as a filtration medium is eliminated.

More specifically, the present invention proposes a tank containing a body of contaminated liquid communicating with a lower filtrate chamber connected to the intake of a filtrate pump. Interposed between the tank and the filtrate chamber is a fixed filter medium capable of performing a primary filtering function. A drag-out conveyor is provided in the tank, the conveyor preferably being of the flexible chain type and having flights overlying the fixed medium to scrape accreted contaminants therefrom. The transversely extending conveyor flights are spaced above the fixed filter medium through relatively short, predetermined dimensions, so that a layer of contaminants is always maintained upon the surface of the fixed filter medium to serve as a secondary filter medium. Preferably, the layer of contaminants on the primary medium is periodically scraped therefrom by a conveyor flight contacting the primary filter medium to fully renew the surface of the primary filter medium, thereby avoiding the formation of a stagnant, overly packed and undesirably dense secondary filtration medium.

It is, therefore, an important object of the present invention to provide an extremely simple, continuously operable filter mechanism utilizing primary and secondary filtration media.

It is another object of the present invention to provide a new and improved filtration apparatus utilizing the intake of a filtrate pump to effect the flow of liquid through a fixed primary filter medium and utilizing a continuously advancing drag-out conveyor to maintain a predetermined layer of contaminant particles on the primary filter medium, the contaminant layers serving as a secondary filter medium.

Other objects of this invention will appear in the following description and appended claims, reference being had to the accompanying drawings forming a part of this specification wherein like reference characters designate corresponding parts in the several views.

On the drawings:

FIGURE 1 is a vertical sectional view, somewhat schematic in nature, illustrating a filter apparatus of the present invention capable of carrying out the filtration method of the present invention;

FIGURE 2 is an enlarged vertical sectional view taken along the plane 2—2 of FIGURE 1; and FIGURE 3 is an enlarged fragmentary elevational view schematically illustrating the operation of the apparatus of the present invention.

Before explaining the present invention in detail, it is to be understood that the present invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 designates generally a tank or receptacle having surrounding fluid-impermeable walls, including a bottom wall 11, side walls 12, a first end wall 13 and a second end wall 14. The one end wall 13 extends throughout the height of the entire tank 10, the second end wall 14 terminates short of the upper end of the tank in an out-turned flange 15 for a purpose to be hereinafter more fully described.

Disposed interiorly of the tank 10 is an interior dividing wall, indicated generally at 16 and including a downwardly and inwardly inclined first portion 17 adjacent the end wall 13, a curved joining portion 18, a horizontal bottom section 19 abutting the inner surface of the bottom wall 11 of the tank and an upwardly and outwardly inclined ramp portion 20. This ramp portion 20 abuts the upper surface of the flange 15 of the end wall 14 and projects beyond the end wall 14 to terminate in a downturned drain lip 21.

The wall 16 thus joins the side walls 12 and projects transversely across the tank 10 to divide the tank into an upper contaminated liquid chamber 25 and a lower filtrate chamber 26, these chambers communicating through an aperture 27 in the sloping wall 20.

Interposed between the compartments 25 and 26, and located in the aperture 27, is a fixed primary filter medium indicated generally at 30. As best seen in FIGURE 2 of the drawings, this fixed primary filter medium 30 is of the "wedge wire" type, i.e., a plurality of parallel, longitudinally extending, transversely spaced rods 31 of specific wedge shape configuration. Preferably, the rods 31 are of trapezoidal shape, having horizontally aligned upper surfaces 32, downwardly and inwardly inclined edges 33 and a lower surface 34 substantially shorter than the upper surface 32.

Since the flow of contaminated fluid is vertically downwardly from the upper compartment 25 into the lower compartment 26, the spacing between the upper surface 32 of the bars 31 will prevent the flow of contaminants into the lower compartment 26 and will retain the contaminants upon the upper surfaces 32. The downwardly and inwardly tapered side walls 33 of the bars make the bars self-cleaning and avoid any clogging of contaminants beneath the level of the upper surfaces 32.

To aid in the flow of liquid from the upper compartment 25 into the lower compartment 26, the lower compartment 26 is provided with an outlet aperture 35 communicating through conduit 36 with the intake of a centrifugal filtrate pump 37, filtrate liquid exiting from the pump 37 through the vertical outlet conduit 38. Thus, the pump 37 serves to reduce the pressure within the chamber 26 to induce the flow downwardly through the permanent filter medium 30 at a differential pressure greater than the hydrostatic pressure normally exerted by liquid in the compartment 25.

A flexible conveyor, indicated generally at 40, is provided in the upper compartment 25, this conveyor 40 comprising a plurality of carrier links 41 joined to connector links 42 by pivot pins 43. Actually, a pair of such chains 40 are provided, each chain being adjacent one of the side walls 12 of the tank 10, as best illustrated in FIGURE 2. The chains are each lapped about a drive sprocket 45 which is laterally beyond the confines of the tank 10 and adjacent the end wall 14 thereof, and an idler sprocket 46 located interiorly of the tank above the level of liquid therein and adjacent the portion 17 of the wall 16.

Secured ot the end wall portion 17 of the wall 16 is a guide channel indicated generally at 47, confining the chain 40 to a path paralleling the wall 17, this guide channel 47 continuing around the arcuate portion 18 of the wall 16 to lie parallel to the bottom wall portion 19. The sprockets 45, 46 and the guide channel 47 thus restrain the conveyor to the path of travel illustrated in FIGURE 1 of the drawings. Each of the carrier links 41 of the chain 40 carries a transverse conveyor flight 50, 52, these flights being secured to the inner confronting faces of the spaced parallel chains so that the flights project transversely across the entire width of the tank 10.

As illustrated in FIGURE 2, the conveyor flights 50 have lower edges 51 which are spaced above the upper surfaces 32 of the primary filter medium 30 for a distance on the order of 1/16" to 1/4". Additional flights 52 of greater vertical extent are also provided, three or four such flights 52 being provided throughout the entire extent of the conveyor 40, these flights having their lower surface 53 snugly abutting the upper surfaces 32 of the filter medium 30.

The conveyor 40 is advanced in its path defined by the sprockets 45, 46 and the guide channel 47 by means of a drive mechanism, including a drive belt or chain 55 lapping a sheave or sprocket 56 driving the shaft 57 for the sprockets 45.

The drive belt or chain 55 is driven by a chain or sprocket 58 mounted on the output shaft of a chain speed mechanism 59, which, in turn, is driven by a suitable source of power, such as an electric motor 60.

In the operation of the device the contaminated liquid compartment 25 is filled with contaminated liquid to the level 61, such liquid entering the tank by means of pipe 63 provided with suitable controls for maintaining it at the level 61. Operation of the pump 37 will produce a reduced pressure in the filtrate chamber 26, so that liquid from the body of liquid in the chamber 25 passes through the fixed filter medium 30 under a pressure differential in excess of that pressure normally generated by the hydrostatic head developed in the compartment 25.

As the contaminated liquid passes through the filter medium 30 by flowing intermediate the individual wedge wire elements 31, contaminant solids are disposed upon the surfaces 32 of the wedge wire element 31, as best illustrated in FIGURE 3 of the drawings. These contaminant particles 65 form a layer on the surfaces 32 and serve to form a secondary filter medium through which subsequent contaminated liquid is filtered. Further, the accretion of these particles on the surfaces 32 will form a secondary filter medium of great efficiency, capable of straining from the liquid such particles as are finer than those capable of being removed by the fixed permanent filter medium.

Since the chain 40 travels continuously in a counterclockwise direction, and at a relatively low speed, the flights 50 serve to reduce the thickness of the accreted material to a thickness equal to the distance of the lower edges 51 of the flight 50 from the upper surfaces 32 of the elements 31. Further, the medium 30 being fixed and the conveyor being lineally displaceable toward the right, as shown in FIGURES 1 and 3, the motion of the conveyor carries accreted contaminant particles along the inclined wall 20 onto the discharge lip 21 from which the particles fall by gravity into a tote box or receptacle 65. Since the lower edges 51 are at the same level as the upper surfaces of the wall 20, efficient removal of contaminant particles is assured.

Additionally, the slow rate of movement of the conveyor, i.e., on the order of one foot per minute, prevents any violent relative motion between the body of contaminated liquid and the conveyor, such as would cause eddy currents therein to wash the contaminant from the flights 50. The flights 52 preferentially are utilized to avoid undue compacting of the contaminant particles by periodical removal of the particles as the flight edges or lower surfaces 63 wipe immediately over the medium surfaces 52.

Utilization of the pump intake to create a pressure differential across the fixed filter medium 30 is critical in order to induce a sufficient flow through the layer of contaminant particles. Thus, an adequate filtration capacity is provided, even though the contaminant particles themselves are utilized for the secondary filter medium. By continuously operating both the pump 37 and the conveyor 40, there is no filter down time, there is no necessity for differential pressure sensing elements, and there is no necessity for elaborate control mechanisms.

I claim:

1. In a filter apparatus for removing contaminant particles from a contaminated liquid, a tank structure subdivided by common stationary wall means into an upper compartment adapted to maintain a substantially constant body of contaminated liquid and a lower compartment adapted to be filled with filtrate, said wall having an opening therein interconnecting said compartments, a perforate fixed primary filter medium at said opening and interposed between said compartments to remove said particles from liquid flowing through said opening, such particles accreting on the upper surface of said medium, an endless conveyor in the form of a closed loop having a lower reach depending into said upper compartment, said conveyor having first transverse flights spaced from the upper surface of said fixed filter medium and contacting contaminant particles accreted thereon, power means for advancing said conveyor continuously in said loop with said first flights dragging out said accreted contaminant particles while leaving on said primary filter medium a layer of said particles of a thickness capable of serving as a secondary filter medium, said conveyor further having second transverse flights interposed between groups of said first transverse flights and of dimensions to contact said primary filter medium in order to periodically remove said secondary filter medium from said primary filter medium, and a filtrate pump having its intake connected to said lower compartment to create a vacuum therein supplementing the static head of said contaminated liquid in said upper compartment.

2. In a filter, an open-topped tank having wall means therein dividing the tank into an upper contaminated liquid chamber and a lower vacuum chamber underlying said wall means, said wall means being apertured to interconnect said chambers and said vacuum chamber being sealed continuously from the atmosphere by liquid in the upper tank chamber, a fixed perforate filter medium of a size and extent to at least cover said aperture and effective to remove contaminant particles from said liquid flowing from said tank into said vacuum chamber, means for withdrawing filtrate liquid from said vacuum chamber to create a sub-atmospheric pressure in said chamber, an endless looped conveyor having a lower reach depending into said tank and having first transverse flights overlying said medium in spaced relation thereto, and continuously operable power means actuatable for advancing said conveyor in its loop so that said first conveyor flights remove a portion only of the contaminant particles from said fixed filter medium, the remaining particles forming a secondary filter medium through which liquid flows into said vacuum chamber, said conveyor having at least one second transverse flight of dimensions to contact said fixed perforate filter medium in order to periodically remove said secondary filter medium from said fixed perforate filter medium.

3. In a filter apparatus for removing contaminant particles from a contaminated liquid, a tank structure subdivided by common stationary wall means into an upper compartment adapted to maintain a substantially constant body of contaminated liquid and a lower compartment adapted to be filled with filtrate, said wall having an opening therein interconnecting said compartments, a permanently fixed perforate filter medium in said opening to be interposed between said compartments and to remove said particles from said liquid flowing through said opening, such particles accreting on the upper surface of said medium, an endless conveyor in the form of a closed loop having a lower reach depending into said upper compartment and having transverse flights, the majority of said flights having undersurfaces spaced from the upper surface of said medium and the remainder of said flights having undersurfaces contacting said medium, power means for continuously advancing said conveyor in said loop with the majority of said flights accommodating the presence of a layer of contaminant particles on said medium while dragging out only a portion of said accreted particles and said remainder of said flights dragging out any such accreted particles to remove said layer, and a filtrate pump having its intake connected to said lower compartment to create a vacuum therein supplementing the static head of said contaminated liquid in said upper compartment to thereby increase the flow of liquid through said medium and any particles accreted thereon.

4. In a filter apparatus for removing contaminant particles from a contaminated liquid, including a tank structure subdivided by common stationary wall means into an upper compartment adapted to maintain a substantially constant body of contaminated liquid and a lower compartment adapted to be filled with filtrate, said wall having an opening therein interconnecting said compartments, a permanently fixed perforate filter medium in said opening to be interposed between said compartments and to remove said particles from said liquid flowing through said opening, such particles accreting on the upper surface of said medium, a filtrate pump having its intake connected to said lower compartment to create a vacuum therein supplementing the static head of said contaminated liquid in said upper compartment to thereby increase the flow of liquid through said medium, the improvements of an endless conveyor in the form of a closed loop having a lower reach depending into said upper compartment and having transverse flights, the majority of said flights having undersurfaces spaced from the upper surface of said medium, and at least one of said flights having an undersurface for contacting the upper surface of said medium, power means for continuously advancing said conveyor in said loop with the spacing of the undersurfaces of said majority of flights above said medium accommodating the presence of a layer of contaminant particles on said medium while dragging out only a portion of said accreted particles, said layer of particles serving as a secondary filter medium, and with said one flight acting to remove said layer of particles when passing over said fixed medium in contact therewith.

References Cited
UNITED STATES PATENTS

| 1,002,017 | 8/1911 | Warren | 210—65 |
| 2,014,834 | 9/1935 | Coffey et al. | 210—413 |
| 2,705,562 | 4/1955 | Albertson | 209—464 |

SAMIH N. ZAHARNA, *Primary Examiner.*